United States Patent Office
3,664,849
Patented May 23, 1972

3,664,849
PRODUCTION OF MEAT SNACK PRODUCT AND PRODUCT
Robert F. Autry, Neshanic Station, N.J., assignor to Devro, Inc.
No Drawing. Filed Feb. 10, 1970, Ser. No. 10,304
Int. Cl. A22c 18/00; A23l 1/00
U.S. Cl. 99—107          11 Claims

ABSTRACT OF THE DISCLOSURE

Snack type products such as dried sausage meats or other dried foods are produced in the shape of relatively flat bars similar to candy bars by processes adaptable to high speed production methods which involve continuously extruding wet emulsions of the edible food component over a moving belt which supports an edible collagen film having good wet burst strength, and then covering the emulsion with an upper layer of the edible collagen film and applying pressure thereto to form a laminate which is then dried to a moisture content of 20 percent or less, cut to size, and overwrapped; the laminate form allowing the easy handling of the meat emulsion as a continual blanket.

---

This invention relates to a dried meat snack product (and analagous products from other edible substances) and the process by which it is made, and is more particularly concerned with a dried meat snack bar product produced in a continuous manner from an edible collagen film placed on both sides of a sheet of meat emulsion to form a laminate which is easily handled in the subsequent processing steps.

BACKGROUND OF THE PRESENT INVENTION

It was evident that there was a real need for a shelf table meat snack item having good shelf life properties and which could be made without the hand labor required in present products. The product and process of the present invention fills both these needs. But to develop the present inventions many obstacles had to be overcome, the two major ones being (1) to develop a previously unavailable edible film which would serve some of the same functions as the casing now does for smoked and dried sausage meat products and (2) to develop a process which enables the processor to mass produce without the high level of hand labor needed for the sausage type products now on the market, e.g. the variety of dried pepperoni type sausages now sold in individual wrapped packages for use as snacks.

Initially an effort was made to make a meat snack product from a sausage meat emulsion without any edible film, but the following problems were encountered:

(a) Rolling the meat emulsion, without any film, caused the meat to stick to the rollers preventing a uniform layer of meat from being extruded and rolled in sheet form.

(b) Handling a sheet of meat, without any film for structural support, would not be possible on a commercial basis since while one could hand carry small samples to the smokehouse for processing, any larger quantity fell apart.

(c) Processing the meat emulsion, without any film, caused the unsupported meat layer to drip through the holding screens, thereby losing all fat and moisture, and yielding a crust-like product which appeared quite unpalatable.

(d) Cutting this unsupported meat layer tended to cause splitting and fracturing which would create a problem in present types of commercial cutters.

After it became apparent that the use of an edible film would be necessary, a search was made for a suitable existing film, but none was found. Various films made from the same collagen gels used to make collagen casings of the type used for sausage casings were tried but were not satisfactory. Finally a special film usable in the product and process of the present invention was developed. The specific details of that film and how it is made are disclosed and claimed in the copending U.S. patent application Ser. No. 10,305 of Albert T. Miller entitled "Edible Collagen Film" filed even date herewith and assigned to the same assignee as this application. It is an edible collagen continuous film having a wet burst strength of at least 0.80 minutes (and preferably more), a dry tensile strength of at least 9,000 p.s.i. which softens slightly with heat but still remains fairly intact at temperatures of 160° F., which is made with a plasticizer and with collagen which has been enzyme modified by a fungal protease derived from *Aspergillus oryzae*.

The newly developed film has to and does perform the following functions: be permeable to smoke, have the wet burst strength to hold wet meat and similar emulsions without breaking, form a bond with the meat, be permeable to water vapor to allow drying, not be excessively tough after processing, be edible and relatively tasteless, have considerable dry tensile strength, be somewhat resistant to heat during processing, be sufficiently water-insoluble to hold wet meat emulsions, act as a barrier against oxidation (else rancidity would result) and against fat migration (else the fat would come to the surface).

To fill this need, the newly developed edible collagen film was extruded and dried in sheet form. The gel or dispersion used to make this extrusion mixture is made from the corium layer of fresh hide which was treated with a particular type of proteolytic enzyme to reduce the viscosity of the gel in order to give a more uniform extrusion and also to reduce the toughness of the resulting film. The dispersion used also contains a plasticizer and optionally contains one or more of an edible cellulose, a modified soy protein, a preservative, etc. The dispersion is dried to form a collagen film, which preferably is treated with gaseous ammonia to increase its wet burst strength. The clear collagen film resulting from this procedure retained all of the properties needed for a smoked and dried meat product. Edible collagen films of one mil thickness have proven successful. The thickness can vary, but if too thin, the film will be too weak while if too thick, the film will be too tough for use in the products of the present invention. While the invention is described with reference to the particular collagen film invented by Albert T. Miller, any other edible film having the necessary properties can also be used, whenever it becomes available.

The closest prior art meat products to those of the present invention are of the dried sausage type and shape. The typical procedure used to make them is to place a shirred strand of casing on a stuffing horn and hand fill each strand with a meat emulsion. These stuffed strands are then individually hung on a smokehouse tree for the smoking and drying cycle. The last processing step is to hand remove them from these smokehouse trees and cut them for the packaging step.

THE PRESENT INVENTION

The present invention eliminates these prior art handling steps and associated costs by utilizing the newly developed edible collagen film. A slit die extruder was mounted over a roll of this edible film. The extruded meat emulsion is placed on a moving belt on which the edible film has first been placed. A second roll of the edible film is continually placed over this emulsion and rolling pressure is applied thereto. This results in a continual laminate or blanket or belt of meat emulsion with the edible film adhered to both the top and bottom.

Once the blanket or belt or laminate formed of meat emulsion placed between layers of edible film comes off of this moving belt, it then goes into the smokehouse. The process from this point on will be similar to that of any smoked and dried product, the laminates being cured, dried, and smoked in this form. In place of natural smoke, the meat snack product of the present invention may be smoked using liquid smoke in the well-known manner used with frankfurters, etc. For the present type of smokehouses used in the sausage-making industry, the laminate is cut and placed on wire trays which are then brought into the smokehouse. The present invention is especially well adapted to be used with continuous driers, which will replace the present smokehouses. Such driers, would likely use liquid smoke, if smoke taste is desired.

Once out of the smokehouse or drier, these laminates can be mechanically cut into candy bar size meat snacks and packaged by any standard candy bar overwrapper. After cutting, the meat bars will have the collagen film adhering to and bonded to both the top and bottom portions, but there will be no film on the sides thereof.

Tests of the present invention have confirmed that it results in the advantage of greatly reducing hand labor in going from the sausage type operation to this mechanical one. A second advantage is that because of the lessened thickness of the product (which is not critical and can vary as desired with from between ⅛ to ½ thicknesses present the most ease of handling and which is preferably about ¼ inch thick) and the resultant large surface area, this product can pick up the required level of smoke as well as dry to the desired level necessary for shelf stability in a reduced time over a dry sausage type operation. Present practice is to reduce the moisture content of dried sausage products below 20 percent by weight of moisture content to have a 90 day shelf life. The products of the present invention should normally be dried to this extent or below also. Where longer shelf life is desired the product will be dried even more. A product dried to 10 percent moisture content has been shown to be feasible.

A secondary advantage is that use of this "candy bar" form of the present invention has no strong association with the prior art pepperoni type tick. This would allow a line of similar type products to be made such as ham and cheese, barbeque beef or even chicken and similar types of food preparations to be made and sold with no adverse mental associations to a previous standard such as the round stick, which has become associated with the pepperoni product. In the candy bar form the product could be spiced and formulated to appeal to the public as a snack or a miniature lunch. Since the product is shelf stable, it could be sold at the candy bar shelf in stores and through vending machines.

It will be evident from the foregoing discussion that a wide variety of meat bar snack type products and of other dry or semi-dry nonmeat products (which can be made from extrudable emulsions also) can be formulated, all within the scope and spirit of the present invention.

The following will illustrate a preferred product, and method of carrying out the invention.

PREPARATION OF MEAT EMULSION

One typical emulsion made for use in the meat bar snack product of the present invention would be a pepperoni type. This is prepared as follows:

Chop two parts chuck tenders to one part navels. While chopping, the spices are blended in. If starter culture is desired to give the "tang" to the end product, it should be added at this time. The temperature of this emulsion should be kept cold (30–40° F.) to prevent excess smearing of the fat.

A typical formulation for such product is:

120# chuck tenders
60# navels
1700 gms. salt
1000 gms. dextrose
250 gms. black pepper
100 gms. red pepper
90 gms. mustard
90 gms. coriander
70 gms. nutmeg
50 gms. garlic
25 gms. sodium erythorbate
100 gms. cure
100 gms. starter culture Virtually any of the meat emulsion formulations used in making sausages also can be used here. Other formulations which have been used are hot pepperoni, ham and cheese, and barbecue chicken. All of these formulations follow basically the same procedure and are well-known in the industry.

Manufacturing procedures (A) The procedure on a bench-top preparation scale is as follows:

Take the above meat emulsion and place it on a sheet of edible collagen film of the type previously discussed, which is about 1 mil thick and about 6 inches wide. Place a second sheet of the edible film over the emulsion and roll with a rolling pin to a given thickness such as ¼ inch. This laminated sheet can then be handled like a blanket.

The sheet is then placed in a smokehouse or drier on wire sheets. If a starter culture is used, the initial part of the drying cycle is at 105° F. with high humidity. This allows the culture to grow and produce the acid necessary for the tangy taste associated with a pepperoni stick. If no starter culture is needed, higher temperatures and lower humidity conditions can be used which result in higher drying rates. At some point during the drying or smoking cycle, a temperature high enough to kill the naturally-occurring organisms present in the meat emulsion should be reached. A temperature (internal meat temperature) of about 150° F. for 30 minutes has been found operative for this purpose. Total drying time varies greatly. With a product containing a starter culture and which is about ⅜ inch thick, a 23 hour drying cycle was used, in which temperatures varied from 100°–160° F. With no starter culture used, a laminate 3/16 inch thick was dried in about an 8 hour drying cycle, with most of the drying cycle being at low humidity and higher temperatures.

When the moisture level has dropped below 20 percent, the sheets are rolled and cut into candy bar shape.

(B) The procedure to manufacture on a commercial scale involves automating the system as much as possible to eliminate the hand labor which is a major cost factor. To do this, the following type of system can be employed.

A slit die extruder having a wide slit is used to extrude a continual blanket of emulsion down onto a sheet of edible collagen film which is fed from a lower roll onto a moving Mylar belt, which serves to support and move it as a moving belt of film. A second layer of film is unrolled from an upper roll and is continually fed out and placed on top, with continuous pressure being applied, forming a laminate of film, meat, and film, which can be handled like a blanket. This moving blanket or laminate then goes through a continuous drier, or as a less desirable alternative, is sliced every several feet as may be desired to fit on trays to be placed in present types of drying rooms. After this laminate or blanket has been dried to below about 20 percent moisture content, it is then cut automatically into candy bar shapes and overwrapped by any of several automatic machines designed for this operation.

The foregoing processes utilizing the edible collagen film give one the ability of handling a thin sheet of ground meat as easily as a blanket. In addition, this sheet allows drying to take place and prevents any hard protein shell from forming on the surface with the undesired associated discoloration. The edible collagen film used is also permeable to smoke, permitting a smoked product if this is desired. The resultant meat bar snack product has a much greater shelf life than a similar product without the film on either side would have due to the fact that the film prevents the fat from migrating out and also acts as a barrier for mold growth.

It is contemplated that the new product win be commercialized in vending machines. This will be a most unusual and desirable result with a meat-based product since potential consumers will now have the opportunity to buy a dried meat bar snack which is high in protein and low in carbohydrates rather than the assortment of starch and sugar based products now offered at candy counters.

Other related products within the scope of this invention which can easily be visualized include: snack bars made with semi-dry fruits, with vegetables, hot dog emulsion containing relish, with smoked ham emulsion containing pineapple, etc. Vitamins and minerals can be added, which will then provide a complete, nutritious meal in a bar.

While this invention has been described fully and completely with special emphasis upon certain preferred embodiments, other alternatives and equivalents within the spirit of this invention will be apparent to those skilled in this art, which are also to be included within the scope of the appended claims.

What is claimed is:

1. A flat edible dried bar snack type product having good shelf life characteristics comprising a laminate of a thin edible collagen film, which film is permeable to smoke, acts as an oxygen barrier, and softens slightly with heat while still remaining fairly intact at temperatures below about 160° F., made from an ezyme-modified collagen and a plasticizer, having a dry tensile strength above 9,000 p.s.i. and a wet burst strength of at least 0.80 minute on both the upper and lower surfaces of the laminate, having no film on the sides thereof, and having an edible food component in the thicker center portion thereof.

2. The edible product of claim 1 wherein the laminate has a relatively uniform thickness of between about ⅛ and ½ inch.

3. The edible product of claim 1 wherein the edible food in the center portion of the laminate is a meat emulsion.

4. The edible product of claim 3 wherein the laminate of collagen film and meat emulsion has been dried to a moisture content or below about 20 percent.

5. The edible product of claim 4, which has been smoked.

6. The process of producing a flat edible dried bar snack type product which comprises: placing an edible food component on a lower thin edible collagen film having a dry tensile strength above 9,000 p.s.i. and a wet burst strength of at least 0.80 minute and which is permeable to smoke, permeable to water vapor, and capable of acting as a barrier against oxidation and fat migration, and which collagen film softens slightly with heat while still remaining fairly intact at temperatures below about 160° F.; covering the edible food component with an upper thin edible collagen film having a dry tensile strength above 9,000 p.s.i. and a wet burst strength of at least 0.80 minute and which is permeable to smoke, permeable to water vapor, and capable of acting as a barrier against oxidation and fat migration and which collagen film softens slightly with heat while still remaining fairly intact at temperatures below about 160° F.; applying pressure thereto to form a laminate, drying to a moisture content of below about 20 percent, and cutting the dried laminate to the desired size.

7. The process of claim 6 wherein the edible food component is continuously fed so as to continuously cover the lower collagen film and wherein the upper collagen film is then continuously fed and applied thereon with pressure.

8. The process of claim 7 wherein the edible food component is continuously fed by being extruded.

9. The process of claim 8 wherein the edible food component is a wet meat emulsion.

10. The process of claim 9 wherein the wet meat emulsion laminate is smoked.

11. In a process of producing a flat edible dried meat bar product in a continuous manner, the steps of continuously placing a thin flat edible film, which film has a dry tensile strength above 9,000 p.s.i. and sufficient wet burst strength to support a wet meat emulsion during subsequent processing steps and which film is permeable to smoke, permeable to water vapor, and capable of acting as a barrier against oxidation and fat migration, and which film softens slightly with heat while still remaining fairly intact at temperatures below about 160° F. and adheres to and forms a bond with the meat of the meat emulsion after the subsequent drying step is completed, on both sides of a thicker sheet of continuously extruded meat emulsion and forming a laminate thereof; drying said laminate to a moisture content of below about 20 percent; and cutting the dried laminate to desired size.

References Cited
UNITED STATES PATENTS

| | | | |
|---|---|---|---|
| 1,956,239 | 4/1934 | Kuhner | 99—107 |
| 3,235,641 | 2/1966 | McKnight | 99—176 X |
| 3,277,846 | 10/1966 | Kesselman | 99—107 X |

HYMAN LORD, Primary Examiner

U.S. Cl. X.R.

99—1, 108, 109